(12) United States Patent
Nakamura et al.

(10) Patent No.: US 10,017,835 B2
(45) Date of Patent: Jul. 10, 2018

(54) METHOD FOR PRODUCING NICKEL SULFIDE AND HYDROMETALLURGICAL METHOD FOR NICKEL OXIDE ORE

(71) Applicant: SUMITOMO METAL MINING CO., LTD., Tokyo (JP)

(72) Inventors: Shinichiro Nakamura, Tokyo (JP); Osamu Nakai, Tokyo (JP); Hiroyuki Mitsui, Tokyo (JP); Keisuke Shibayama, Tokyo (JP)

(73) Assignee: SUMITOMO METAL MINING CO., LTD., Tokyo (JP)

(*) Notice: Subject to any disclaimer, the term of this patent is extended or adjusted under 35 U.S.C. 154(b) by 0 days.

(21) Appl. No.: 15/554,869

(22) PCT Filed: Dec. 1, 2015

(86) PCT No.: PCT/JP2015/083794
§ 371 (c)(1),
(2) Date: Aug. 31, 2017

(87) PCT Pub. No.: WO2016/139858
PCT Pub. Date: Sep. 9, 2016

(65) Prior Publication Data
US 2018/0044760 A1    Feb. 15, 2018

(30) Foreign Application Priority Data

Mar. 5, 2015  (JP) .................. 2015-043693

(51) Int. Cl.
*C01G 53/11*  (2006.01)
*C22B 3/44*  (2006.01)
*C22B 3/00*  (2006.01)

(52) U.S. Cl.
CPC .............. *C22B 3/44* (2013.01); *C01G 53/11* (2013.01); *C22B 23/043* (2013.01); *C01P 2004/61* (2013.01)

(58) Field of Classification Search
CPC ......... C01G 53/11; C22B 3/44; C22B 23/043; C01P 2004/61; C01B 17/901
See application file for complete search history.

(56) References Cited

U.S. PATENT DOCUMENTS

| 4,547,347 A | 10/1985 | Lussiez et al. |
| 7,563,421 B2 * | 7/2009 | Kobayashi ............ C22B 23/043 423/140 |
| 7,771,788 B2 | 8/2010 | Kinuta et al. |
| 8,343,447 B2 * | 1/2013 | Shibayama ......... C22B 23/0461 210/702 |
| 8,747,787 B2 * | 6/2014 | Kobayashi ............ C22B 3/0005 423/139 |
| 8,916,115 B2 * | 12/2014 | Matsubara ............ C22B 23/043 422/187 |
| 2005/0265910 A1 | 12/2005 | Kobayashi et al. |
| 2006/0169104 A1 | 8/2006 | Chamberlain et al. |
| 2008/0107902 A1 | 5/2008 | Kinuta et al. |
| 2010/0018350 A1 | 1/2010 | Shibayama et al. |
| 2011/0123418 A1 * | 5/2011 | Roche ...................... C01G 1/12 423/22 |
| 2013/0074653 A1 | 3/2013 | Kobayashi et al. |
| 2014/0151472 A1 | 6/2014 | Mitsui et al. |

FOREIGN PATENT DOCUMENTS

| EP | 2749660 A1 | 7/2014 |
| JP | 06-081050 A | 3/1994 |
| JP | 2005-350766 A | 12/2005 |
| JP | 2006-075708 A | 3/2006 |
| JP | 2010-031302 A | 2/2010 |
| JP | 2012-031446 A | 2/2012 |
| JP | 2014-141749 A | 8/2014 |
| WO | WO 2009155652 A1 * | 12/2009 ............... C01G 1/12 |

OTHER PUBLICATIONS

Extended European Search Report dated Feb. 1, 2018, issued to EP Patent Application No. 15884024.9.
International Search Report dated Feb. 16, 2016, issued for PCT/JP2015/083794.

* cited by examiner

*Primary Examiner* — Timothy C Vanoy
(74) *Attorney, Agent, or Firm* — Locke Lord LLP

(57) ABSTRACT

Provided is a method for producing nickel sulfide from an acidic sulfuric acid solution containing nickel, which is capable of suppressing particle diameters of nickel sulfide obtained thereby. The present invention is a method for producing nickel sulfide by causing a sulfurization reaction by blowing a hydrogen sulfide gas into an acidic sulfuric acid solution containing nickel, wherein: nickel sulfide having particle diameters of 5-20 μm and serving as seed crystals is added into an acidic sulfuric acid solution having a nickel concentration of 0.5-5.0 g/L in an amount of 40-500% by mass relative to the amount of nickel contained in the acidic sulfuric acid solution; and a hydrogen sulfide gas is blown into the acidic sulfuric acid solution, into which the seed crystals have been added, while setting the amount of the hydrogen sulfide gas blown in to be within the range of 0.30-0.85 $Nm^3/kg$-Ni.

5 Claims, 2 Drawing Sheets

METHOD FOR PRODUCING NICKEL SULFIDE AND HYDROMETALLURGICAL METHOD FOR NICKEL OXIDE ORE

TECHNICAL FIELD

The present invention relates to a method for producing nickel sulfide, and more particularly to a method for producing nickel sulfide in which nickel sulfide is obtained by blowing hydrogen sulfide gas into an acidic aqueous solution of sulfuric acid containing nickel and cobalt for sulfidization in a sulfidization step in a hydrometallurgical method for nickel oxide ore using a high pressure acid leaching method and a hydrometallurgical method for nickel oxide ore to which the method for producing nickel sulfide is applied.

BACKGROUND ART

Hitherto, as a smelting method for nickel, a method in which a mat having a nickel grade of about 30% by mass is obtained by dry smelting of nickel sulfide ore and electric nickel is then produced by a chlorine leaching-electrolytic winning method.

In recent years, a high pressure acid leaching (HPAL) method using sulfuric acid has attracted attention as a hydrometallurgical method for nickel oxide ore. This method does not include dry treatment steps such as reduction and drying steps but includes consistent wet steps unlike general conventional smelting methods for nickel oxide ores, and it is thus advantageous in terms of energy and cost. In addition, there is an advantage that it is possible to obtain a sulfide containing nickel (hereinafter, also referred to as "nickel sulfide") in which the nickel grade is improved to about 50% by mass. This nickel sulfide is produced as follows. A sulfide precipitate is generated by purifying the leachate obtained by leaching nickel oxide ore and then blowing hydrogen sulfide gas into the leachate in the sulfidization step to cause a sulfidization reaction. The nickel sulfide is recovered by subjecting the slurry obtained from the sulfidization reaction to a sedimentation separation treatment using a solid-liquid separation device such as a thickener.

The particle diameter of nickel sulfide to be precipitated and generated is in an appropriate range. When the particle diameter is too small, moisture contained in the sulfide powder that is pressed and dried after solid-liquid separation increases and the powder is cured, for example, during transportation after being pressed. In addition, the entire surface area of the powder increases, thus the porosity increases, the volume increases as compared to powders having a larger particle diameter even of the same weight, and the conveyance cost increases. Meanwhile, when the particle diameter is too large, the nickel concentration after the sulfidization reaction increases and the actual yield of nickel decreases.

However, in the related arts, a method for controlling the particle diameter of nickel sulfide to be obtained is not established in a method for obtaining nickel sulfide from an acidic solution of sulfuric acid containing nickel, and a method for stably producing nickel sulfide having a desired particle diameter is demanded.

Patent Document 1 discloses a method in which a complex salt solution of an ion of a base metal such as nickel is atomized by using a nebulizer so as to have a certain particle diameter, the complex salt solution of atomized base metal is brought into contact with or introduced into a reducing solution or reducing gas which reacts with this base metal to instantly reduce the particulate base metal complex salt to a metal, and the fine metal powder thus obtained is recovered. More specifically, this citation 1 discloses a method for controlling the particle diameter of the fine metal powder by changing the solution concentration of the metal complex and the diameter of the nozzle mesh which is attached to the nebulizer and controls the diameter of the droplet discharged from the nebulizer. However, in the case of applying this method to the hydrometallurgical method for nickel oxide ore, suspended solids contained in the leachate to be supplied to the sulfidization step become clogged in the pores of the nebulizer and this causes a decrease in the working rate of operation.

Patent Document 1: Japanese Unexamined Patent Application, Publication No. 2006-75708

DISCLOSURE OF THE INVENTION

Problems to be Solved by the Invention

The present invention has been made in view of the above circumstances, and an object thereof is to provide a method for producing nickel sulfide that can control the particle diameter of nickel sulfide to be obtained in a method for obtaining nickel sulfide from an acidic solution of sulfuric acid containing nickel.

Means for Solving the Problems

The present inventors have conducted intensive investigations to solve the problems described above. As a result, it has been found out that it is possible to stably obtain nickel sulfide of which the particle diameter is controlled to be in a predetermined range by adding nickel sulfide having an adjusted particle diameter at a proportion to be in a specific amount with respect to the amount of nickel contained in an acidic solution of sulfuric acid and blowing hydrogen sulfide gas into the acidic solution of sulfuric acid to which a seed crystal has been added in a specific blow quantity to cause a sulfidization reaction, thereby completing the present invention. In other words, the present invention provides the following.

(1) A first aspect of the present invention is a method for producing nickel sulfide, the method including obtaining nickel sulfide by blowing hydrogen sulfide gas into an acidic solution of sulfuric acid containing nickel to cause a sulfidization reaction, in which nickel sulfide having a particle diameter of from 5 to 20 µm as a seed crystal is added to the acidic solution of sulfuric acid having a nickel concentration of from 0.5 to 5.0 g/L in an amount to be at a proportion of from 40 to 500% by mass with respect to an amount of nickel contained in the acidic solution of sulfuric acid and the hydrogen sulfide gas is blown into the acidic solution of sulfuric acid to which the seed crystal is added whose blow quantity is from 0.30 to 0.85 $Nm^3$/kg-Ni.

(2) A second aspect of the present invention is the method for producing nickel sulfide according to the first aspect, in which a plurality of sulfidization reaction tanks are used and hydrogen sulfide gas of the blow quantity is blown at least into a first sulfidization reaction tank for initially causing a sulfidization reaction.

(3) A third aspect of the present invention is the method for producing nickel sulfide according to the first or second aspect, in which nickel sulfide having a particle diameter of from 5 to 20 µm as the seed crystal is added at a proportion of from 100 to 150% by mass with respect to an amount of nickel contained in the acidic solution of sulfuric acid containing nickel.

(4) A fourth aspect of the present invention is the method for producing nickel sulfide according to any one of the first to third aspects, in which the blow quantity of hydrogen sulfide gas is from 0.33 to 0.82 Nm$^3$/kg-Ni.

(5) A fifth aspect of the present invention is the method for producing nickel sulfide according to any one of the first to fourth aspects, in which nickel sulfide obtained by the sulfidization reaction is repeatedly used as nickel sulfide to be added as the seed crystal.

(6) A sixth aspect of the present invention is the method for producing nickel sulfide according to any one of the first to fifth aspects, in which the acidic solution of sulfuric acid containing nickel is a leachate obtained by subjecting nickel oxide ore to a leaching treatment using sulfuric acid in a hydrometallurgical method for nickel oxide ore.

(7) A seventh aspect of the present invention is a hydrometallurgical method for nickel oxide ore to leach out nickel from nickel oxide ore by using sulfuric acid and to generate a sulfide containing nickel from the leachate obtained, the method including a sulfidization step of adding nickel sulfide having a particle diameter of from 5 to 20 µm as a seed crystal to a leachate having a nickel concentration of from 0.5 to 5.0 g/L in an amount to be at a proportion of from 40 to 500% by mass with respect to an amount of nickel contained in the leachate and blowing hydrogen sulfide gas into the leachate to which the seed crystal is added whose blow quantity is from 0.30 to 0.85 Nm$^3$/kg-Ni to cause a sulfidization reaction.

Effects of the Invention

According to the present invention, it is possible to obtain nickel sulfide of which the particle diameter is controlled to be in a predetermined range.

PREFERRED MODE FOR CARRYING OUT THE INVENTION

Figure 1:
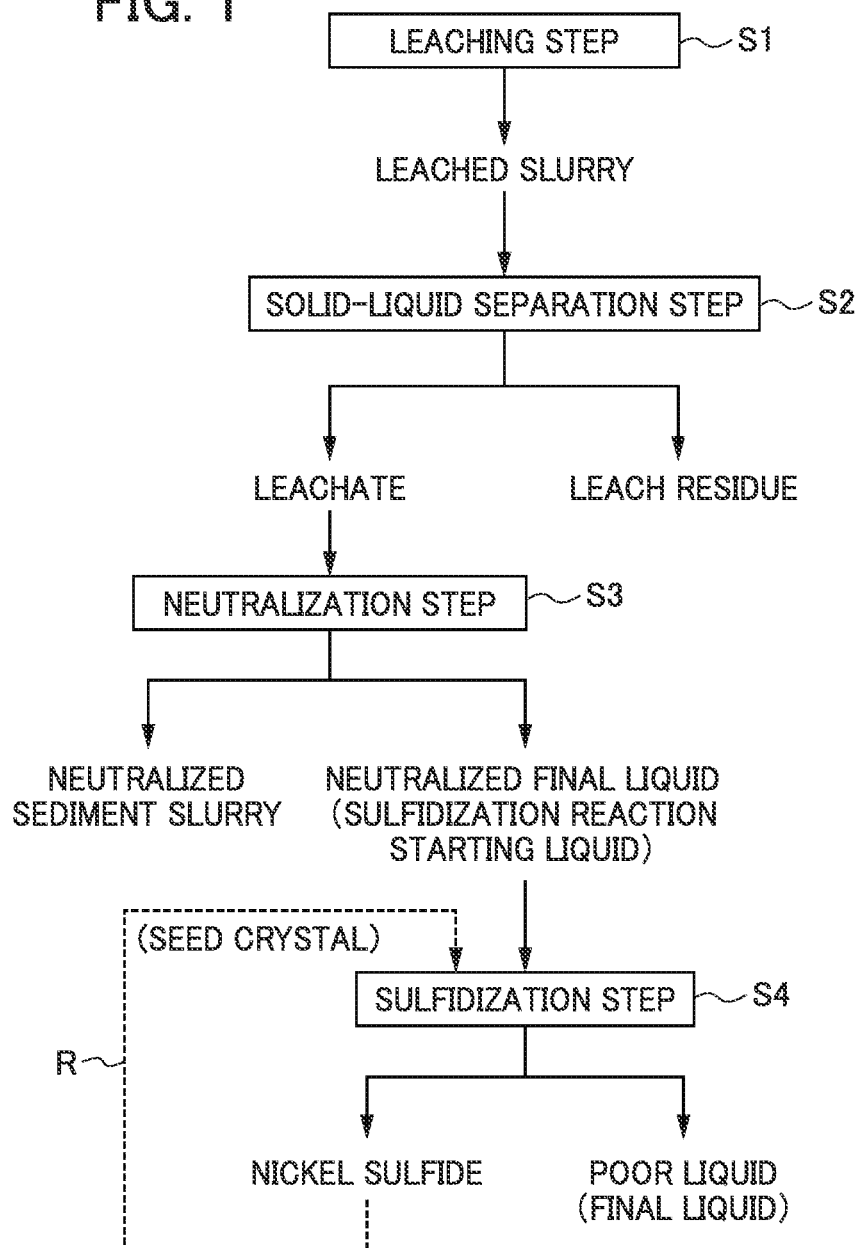
FIG. 1 is a process chart illustrating the procedure of a hydrometallurgical method for nickel oxide ore.

Hereinafter, specific embodiments of the present invention (hereinafter referred to as the "present embodiments") will be described in detail. Incidentally, the present invention is not limited to the following embodiments, and various modifications are possible without changing the gist of the present invention.

Incidentally, in the present specification, the case of expressing "X to Y" (X and Y are arbitrary numerical values) means "from X or more to Y or less" unless otherwise stated.

<<1. Overview>>

The method for producing nickel sulfide according to the present embodiment is a method for obtaining nickel sulfide by blowing hydrogen sulfide gas into an acidic solution of sulfuric acid containing nickel to cause a sulfidization reaction. Here, nickel sulfide is a sulfide containing nickel, and it also includes a mixed sulfide of nickel and another metal such as cobalt.

Specifically, in this method for producing nickel sulfide, nickel sulfide having a particle diameter of from 5 to 20 µm as a seed crystal is added to the acidic solution of sulfuric acid containing nickel at a concentration of from 0.5 to 5.0 g/L in an amount to be at a proportion of from 40 to 500% by mass with respect to the amount of nickel contained in the acidic solution of sulfuric acid. Moreover, hydrogen sulfide (H$_2$S) gas is blown into the acidic solution of sulfuric acid to which the seed crystal is added by setting the blow quantity to from 0.30 to 0.85 Nm$^3$/kg-Ni to cause a sulfidization reaction.

As will be described later, this method for producing nickel sulfide can be applied to the treatment in a sulfidization step in a hydrometallurgical method for nickel oxide ore. At this time, a leachate obtained by subjecting the nickel oxide ore to the leaching treatment using sulfuric acid can be used as the acidic solution of sulfuric acid containing nickel. Incidentally, as will be described later, the neutralized final liquid obtained by neutralizing the leachate obtained through the leaching treatment with a neutralizer may be used.

The acidic solution of sulfuric acid containing nickel is an acidic aqueous solution of sulfuric acid having a nickel concentration of from 0.5 to 5.0 g/L. This acidic solution of sulfuric acid may contain, for example, cobalt, iron, manganese, magnesium, aluminum, chromium, and lead as elements other than nickel. In the method for producing nickel sulfide according to the present embodiment, the sulfidization reaction is caused by introducing such an acidic solution of sulfuric acid containing nickel as a sulfidization reaction starting liquid (hereinafter, also simply referred to as the "starting liquid") into a pressure resistant sulfidization reaction tank and blowing hydrogen sulfide gas as a sulfidizing agent into the reaction tank.

With regard to the nickel concentration in the acidic solution of sulfuric acid to be the sulfidization reaction starting liquid, the actual yield of nickel decreases since the nickel concentration is too low when it is less than 0.5 g/L. Meanwhile, in the case of an acidic solution of sulfuric acid having a nickel concentration of more than 5.0 g/L, it is required to prepare the acidic solution of sulfuric acid by using, for example, nickel oxide ore having a high nickel grade as a raw material, but such an oxide ore having a high nickel grade is hardly available and it is thus difficult to stably and efficiently obtain nickel sulfide.

Here, in the sulfidization reaction tank in which the sulfidization reaction takes place, after the acidic solution of sulfuric acid of the starting liquid is introduced thereinto, hydrogen sulfide gas supplied from a hydrogen sulfide gas producing facility or the like is blown into the gas phase portion in the reaction tank and the hydrogen sulfide gas in the gas phase is dissolved in the liquid phase, whereby the sulfidization reaction proceeds.

The sulfidization reaction tank is not particularly limited, but for example, it is possible to use a multistage continuous stirring sulfidization reaction facility consisting of plural stages of sulfidization reaction tanks such as four stages. Usually, the sulfidization reaction tank is a sealed type reaction tank equipped with an inlet for introducing the reaction starting liquid, an outlet for discharging the slurry after the reaction, a gas blowing port for blowing hydrogen sulfide gas, and an exhaust gas outlet for discharging a part of the gas in the sulfidization reaction tank as exhaust gas.

Specifically, for example, in the sulfidization reaction facility consisting of the four stages of sulfidization reaction tanks as described above, first, an acidic solution of sulfuric acid containing nickel of a reaction starting liquid is introduced into the first sulfidization reaction tank of the initial reaction tank among the reaction tanks which are continuously provided and also hydrogen sulfide gas is blown into the gas phase portion in the reaction tank through the gas blowing port. Thereafter, when the sulfidization reaction is caused in the first sulfidization reaction tank for a predetermined time, the solution containing the generated nickel sulfide is then transferred into the second sulfidization reaction tank and hydrogen sulfide gas is appropriately supplied thereto to cause the sulfidization reaction. Thereafter, the sulfidization reaction sequentially proceeds in the third sulfidization reaction tank and the fourth sulfidization reaction tank, and nickel sulfide and the poor liquid of the reacted final liquid are separated from the slurry after the reaction obtained in the fourth sulfidization reaction tank by using a solid-liquid separation device such as a thickener. In this manner, for example, in a sulfidization reaction facility consisting of four stages of sulfidization reaction tanks in total, a reaction for the generation of nickel sulfide based on the sulfidization reaction takes place mainly in the first sulfidization reaction tank and the so-called growth of nickel sulfide thus generated takes place in the subsequent second to fourth sulfidization reaction tanks.

In this manner, upon generating nickel sulfide from an acidic solution of sulfuric acid containing nickel by a sulfidization reaction, it is possible to efficiently cause the generation of nickel sulfide and the growth of the nickel sulfide generated to a desired size by using a sulfidization reaction facility consisting of a plurality of sulfidization reaction tanks.

In the method for producing nickel sulfide according to the present embodiment, upon causing the sulfidization reaction by using the sulfidization reaction tank as described above, nickel sulfide adjusted to have a predetermined particle diameter as a seed crystal is added to the sulfidization reaction starting liquid introduced into the reaction tank. In this manner, the seed crystal serves as a nucleus for the generation of nickel sulfide to be newly precipitated and generated by the sulfidization reaction by adding nickel sulfide having a predetermined particle diameter as the seed crystal, and it is possible to enhance the settleability of fine nickel-containing particles present in the solution by increasing the particle diameter of the nickel sulfide particles to be generated. This makes it possible to sufficiently recover the fine particles as a precipitate of nickel sulfide.

Specifically, in this method for producing nickel sulfide, as a seed crystal, nickel sulfide adjusted to have a particle diameter of from 5 to 20 μm is added in an amount to be at a proportion of from 40 to 500% by mass with respect to the amount of nickel contained in the sulfidization reaction starting liquid.

The method for adjusting the particle diameter of nickel sulfide to be added as a seed crystal is not particularly limited, and for example, the particle diameter can be adjusted by performing a classification treatment at a classification point set so that the particle diameter is equal to or larger than a predetermined size by using a wet cyclone (also referred to as "liquid cyclone"), a vibrating type screen machine, or the like. Among the methods for adjusting the particle diameter, it is particularly preferable to use a method to perform a classification treatment using a liquid cyclone. According to the method using a liquid cyclone, collision or contact between nickel sulfides occurs in the cyclone, granulation proceeds by this, and it is thus possible to more efficiently adjust the particle diameter to be in an appropriate range.

As described above, the amount of nickel sulfide added as a seed crystal is set to an amount to be at a proportion of from 40 to 500% by mass with respect to the amount of nickel contained in the sulfidization reaction starting liquid. When the amount of nickel sulfide added is less than 40% by mass with respect to the amount of nickel in the sulfidization reaction starting liquid, there is a possibility that nickel sulfide to be obtained has a particle diameter of larger than 60 μm. Meanwhile, when the amount of nickel sulfide added exceeds 500% by mass with respect to the amount of nickel contained in the starting liquid, there is a possibility that the nickel concentration in the liquid (reacted final liquid) after the sulfidization reaction is completed is more than 0.25 g/L, and the actual yield of nickel decreases.

In addition, it is more preferable that the amount of nickel sulfide added as a seed crystal is an amount to be at a proportion of from 100 to 150% by mass with respect to the amount of nickel contained in the sulfidization reaction starting liquid. In this manner, by repeatedly using nickel sulfide having a particle diameter of from 5 to 20 μm as a seed crystal so as to have an amount of nickel of from 100 to 150% by mass with respect to the amount of nickel contained in the sulfidization reaction starting liquid and adding hydrogen sulfide gas in a predetermined blow quantity, it is possible to more effectively control the particle diameter of nickel sulfide to be obtained to be in the most preferable particle diameter range, specifically, a particle diameter range of from 10 to 60 μm.

In the method for producing nickel sulfide according to the present embodiment, as described above, hydrogen sulfide gas is blown into the sulfidization reaction starting liquid to which the seed crystal is added at a predetermined proportion by adjusting the blow quantity to from 0.30 to 0.85 $Nm^3$/kg-Ni.

When the blow quantity of hydrogen sulfide gas is less than 0.30 $Nm^3$/kg-Ni, supply of sulfur (S) for the sulfidization reaction is insufficient so that the actual yield of nickel decreases. Meanwhile, it is inefficient that the blow quantity of hydrogen sulfide gas exceeds 0.85 $Nm^3$/kg-Ni, sulfur more than the amount of sulfur required for the sulfidization reaction is supplied and a part of the blown hydrogen sulfide gas is wasted.

In addition, as a method for adding (blowing method) hydrogen sulfide gas, it is possible to add the entire quantity of hydrogen sulfide gas to be supplied to the first sulfidization reaction tank such that the addition rate of hydrogen sulfide gas to the gas phase portion in the first sulfidization reaction tank provided in the first position is in a range of from 0.33 to 0.82 $Nm^3$/kg-Ni, for example, in the case of using a multistage continuous stirring reaction facility. Alternatively, a part of hydrogen sulfide gas to be supplied may be added to the second sulfidization reaction tank while being distributed after the addition rate of hydrogen sulfide gas in the first sulfidization reaction tank is set to be in a range of from 0.33 to 0.82 $Nm^3$/kg-Ni.

As described above, in the method for producing nickel sulfide according to the present embodiment, nickel sulfide having a particle diameter of from 5 to 20 μm as a seed crystal is added to an acidic solution of sulfuric acid containing nickel at a concentration of from 0.5 to 5.0 g/L (sulfidization reaction starting liquid) in an amount to be at a proportion of from 40 to 500% by mass with respect to the amount of nickel contained in the acidic solution of sulfuric acid and hydrogen sulfide gas is blown into the acidic solution of sulfuric acid by setting the blow quantity to from 0.30 to 0.85 $Nm^3$/kg-Ni to cause the sulfidization reaction.

According to such a method, the particle diameter of nickel sulfide to be obtained by the sulfidization reaction can be controlled to be in a predetermined range. Specifically, it is possible to efficiently produce nickel sulfide of which the average particle diameter is appropriately controlled to be in a preferable range of about from 10 to 60 μm.

Here, the particle diameter of nickel sulfide has an appropriate range. When the particle diameter of nickel sulfide is too small, the amount of moisture contained in the nickel sulfide powder after the solid-liquid separation treatment increases and the powder is cured. In addition, the entire surface area of the powder increases, thus the porosity increases, the volume increases as compared to powders having a larger particle diameter even of the same weight, and the conveyance cost increases. Meanwhile, when the particle diameter is too large, the nickel concentration in the final liquid after the sulfidization reaction increases and the actual yield of nickel decreases. For these reasons, the particle diameter of nickel sulfide is preferably in a range of from 10 to 60 μm and more preferably in a range of from 15 to 55 μm as an average particle diameter.

Incidentally, as the seed crystal to be added to the acidic solution of sulfuric acid containing nickel of the sulfidization reaction starting liquid, it is preferable to repeatedly use nickel sulfide obtained by the sulfidization reaction based on the producing method. As described above, in the method for producing nickel sulfide according to the present embodiment, it is possible to obtain nickel sulfide of which the average particle diameter is controlled to be in a preferable range of from 10 to 60 μm, it is thus possible to easily adjust the particle diameter to from 5 to 20 μm by classifying the nickel sulfide obtained without almost increasing the cost, and the nickel sulfide can be suitably used as a seed crystal.

<<2. Application in Hydrometallurgical Method for Nickel Oxide Ore>>

In the method for producing nickel sulfide according to the present embodiment, an acidic solution of sulfuric acid containing nickel is used as a sulfidization reaction starting liquid and hydrogen sulfide gas is added to this solution to cause a sulfidization reaction. As the acidic solution of sulfuric acid containing nickel, for example, it is possible to use a leachate obtained by subjecting nickel oxide ore to a leaching treatment using sulfuric acid, and the leachate is subjected to the sulfidization reaction to obtain nickel sulfide. In this manner, the method for producing nickel sulfide according to the present embodiment can be applied to a hydrometallurgical method for recovering nickel from nickel oxide ore.

Hereinafter, the overview of the hydrometallurgical method for nickel oxide ore will be described, and a specific aspect in which the method for producing nickel sulfide described above is applied to the treatment in the sulfidization step in the hydrometallurgical method will be then described. Incidentally, as the hydrometallurgical method for nickel oxide ore, a hydrometallurgical method using a high pressure acid leaching method (HPAL method) in which leaching is performed at a high temperature and a high pressure is described as an example.

<2-1. Respective Steps in a Hydrometallurgical Method for Nickel Oxide Ore>

FIG. 1 is a process chart illustrating an example of the procedure of a hydrometallurgical method for nickel oxide ore. As illustrated in FIG. 1, the hydrometallurgical method for nickel oxide ore includes a leaching step S1 in which sulfuric acid is added to a slurry of nickel oxide ore of the raw material and the slurry is subjected to a leaching treatment at a high temperature and a high pressure, a solid-liquid separation step S2 in which the residue is separated from the leached slurry to obtain a leachate containing nickel and cobalt, a neutralization step S3 in which the pH of the leachate is adjusted and the impurity element in the leachate is separated as a neutralized sediment slurry to obtain a neutralized final liquid, and a sulfidization step (nickel recovery step) S4 in which hydrogen sulfide gas as a sulfidizing agent is added to the neutralized final liquid to generate nickel sulfide.

(1) Leaching Step

In the leaching step S1, sulfuric acid is added to a slurry (ore slurry) of nickel oxide ore and the mixture is stirred under conditions of a temperature of about from 230° C. to 270° C. and a pressure of about from 3 MPa to 5 MPa by using a high temperature pressurized reaction tank such as an autoclave to generate a leached slurry composed of a leach residue and a leachate.

Examples of the nickel oxide ore may mainly include so-called laterite ores such as limonite ore and saprolite ore. The nickel content in the laterite ore is usually from 0.8 to 2.5% by weight, and nickel is contained as a hydroxide or a magnesium silicate mineral. In addition, the content of iron is from 10 to 50% by weight, iron is mainly in the form of a trivalent hydroxide (goethite), but divalent iron is partly contained in the magnesium silicate mineral. In addition, in the leaching step S1, an oxide ore containing valuable metals such as nickel, cobalt, manganese, and copper, for example, reserves of manganese nodules on the deep ocean floor are used in addition to such laterite ore.

In the leaching treatment in this leaching step S1, for example, leaching reactions and high temperature thermal hydrolysis reactions represented by the following Formulas (i) to (v) take place and leaching out of nickel, cobalt, and the like as a sulfate and immobilization of iron sulfate leached out as hematite are performed. However, immobilization of iron ions does not proceed to completion, and the liquid portion of the leached slurry to be obtained usually contains divalent and trivalent iron ions in addition to nickel, cobalt, and the like. Incidentally, in this leaching step S1, it is preferable to adjust the pH of the leachate to be obtained to from 0.1 to 1.0 from the viewpoint of the filtration property of the leach residue which is generated in the solid-liquid separation step S2 of the next step and contains hematite.

Leaching Reaction

$$MO + H_2SO_4 \Rightarrow MSO_4 + H_2O \quad (i)$$

(Incidentally, M in Formula (i) represents Ni, Co, Fe, Zn, Cu, Mg, Cr, Mn, or the like)

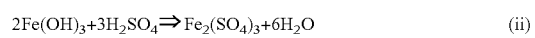

$$2Fe(OH)_3 + 3H_2SO_4 \Rightarrow Fe_2(SO_4)_3 + 6H_2O \quad (ii)$$

$$FeO + H_2SO_4 \Rightarrow FeSO_4 + H_2O \quad (iii)$$

High Temperature Thermal Hydrolysis Reaction

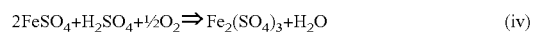

$$2FeSO_4 + H_2SO_4 + \tfrac{1}{2}O_2 \Rightarrow Fe_2(SO_4)_3 + H_2O \quad (iv)$$

$$Fe_2(SO_4)_3 + 3H_2O \Rightarrow Fe_2O_3 + 3H_2SO_4 \quad (v)$$

Incidentally, the amount of sulfuric acid added to the autoclave charged with the ore slurry is not particularly limited, but an excessive amount is used so that iron in the ore is leached out. For example, it is from 300 kg to 400 kg per 1 tonne of ore.

(2) Solid-Liquid Separation Step

In the solid-liquid separation step S2, the leached slurry generated in the leaching step S1 is washed in multiple stages to obtain a leachate containing valuable metals such as nickel and cobalt and a leach residue.

In the solid-liquid separation step S2, the leached slurry is subjected to a solid-liquid separation treatment using a solid-liquid separation device such as a thickener after being mixed with the washing liquid. Specifically, first, the leached slurry is diluted with the washing liquid, and then the leach residue in the leached slurry is concentrated as the sediment of the thickener. This makes it possible to decrease the amount of nickel attached to the leach residue according to the degree of dilution. Incidentally, in the actual operation, it is possible to achieve an improvement of the recovery rate of nickel by continuously using a thickener having such a function in multiple stages.

(3) Neutralization Step

In the neutralization step S3, a neutralizer such as magnesium oxide or calcium carbonate is added so as to adjust the pH to 4 or less while suppressing the oxidation of the leachate and a neutralized sediment slurry containing trivalent iron and neutralized final liquid as a mother liquid for nickel recovery are obtained.

In the neutralization step S3, a neutralizer such as calcium carbonate is added to the leachate so that the pH of the neutralized final liquid to be obtained becomes 4 or less, preferably from 3.0 to 3.5, more preferably from 3.1 to 3.2 while the oxidation of the separated leachate is suppressed, and the neutralized final liquid to be a source of the mother liquid for nickel recovery and a neutralized sediment slurry containing trivalent iron as an impurity element are formed. In the neutralization step S3, by subjecting the leachate to the neutralization treatment (liquid purification treatment) in this manner, the impurities such as trivalent iron ions and aluminum ions remaining in the solution are removed as a neutralized sediment as well as the excess acid used in the leaching treatment by the HPAL method is neutralized to generate a neutralized final liquid.

Incidentally, the neutralized final liquid is a solution based on the leachate obtained by subjecting nickel oxide ore of the raw material to the leaching treatment (leaching step S1) using sulfuric acid, and it is the acidic solution of sulfuric acid containing nickel as described above. This neutralized final liquid is a reaction starting liquid of the sulfidization reaction in the sulfidization step S4 to be described later, and it has a nickel concentration in a range of about from 0.5 to 5.0 g/L. In addition, cobalt as a valuable metal other than nickel is contained in this neutralized final liquid, and this neutralized final liquid contains iron, manganese, magnesium, aluminum, chromium, lead and the like in trace amounts in some cases even if it is a solution obtained through the liquid purification treatment.

[Sulfidization Step (Nickel Recovery Step)]

In the sulfidization step S4, the neutralized final liquid of the mother liquid for nickel recovery is used as the sulfidization reaction starting liquid, hydrogen sulfide gas of a sulfidizing agent is blown into the sulfidization reaction starting liquid to cause the sulfidization reaction, and nickel sulfide containing a small amount of impurity components and a poor liquid (liquid after sulfidization) in which the nickel concentration is stabilized at a low level are generated. Incidentally, in a case in which zinc is contained in the neutralized final liquid, zinc can be selectively separated as a sulfide prior to the separation of nickel as nickel sulfide.

The sulfidization treatment in the sulfidization step S4 can be performed by using a sulfidization reaction tank or the like, and the sulfidization reaction is caused by blowing hydrogen sulfide gas into the gas phase portion in the sulfidization reaction tank in which the sulfidization reaction starting liquid is introduced and dissolving the hydrogen sulfide gas in the solution. By this sulfidization treatment, nickel contained in the sulfidization reaction starting liquid is immobilized and recovered as nickel sulfide.

Incidentally, after the sulfidization reaction is completed, the slurry which is thus obtained and contains nickel sulfide is charged into a sedimentation separation apparatus such as a thickener and subjected to the sedimentation separation treatment and only nickel sulfide is separated and recovered from the bottom portion of the thickener. Meanwhile, the aqueous solution component is recovered as a poor liquid by allowing it to overflow from the top portion of the thickener.

<2-2. Sulfidization Step in Hydrometallurgical Method>

Here, the method for producing nickel sulfide described above can be applied to the treatment in the sulfidization step S4, namely, the sulfidization treatment for generating nickel sulfide from the neutralized final liquid of the acidic solution of sulfuric acid containing nickel.

In other words, in the sulfidization step S4 according to the present embodiment, nickel sulfide having a particle diameter of from 5 to 20 µm as a seed crystal is added to the neutralized final liquid having a nickel concentration of from 0.5 to 5.0 g/L (acidic solution of sulfuric acid containing nickel) in an amount to be at a proportion of from 40 to 500% by mass with respect to the amount of nickel contained in the neutralized final liquid. Thereafter, hydrogen sulfide gas is blown into the neutralized final liquid by adjusting the blow quantity to from 0.30 to 0.85 $Nm^3$/kg-Ni to cause the sulfidization reaction.

The specific method for sulfidization treatment is the same as the method for producing nickel sulfide described above, and the detailed description thereof will be thus omitted here. In the present embodiment, nickel sulfide having an adjusted particle diameter as a seed crystal is added to the neutralized final liquid at a predetermined proportion and hydrogen sulfide gas is added to the neutralized final liquid in a predetermined blow quantity to cause the sulfidization reaction in this manner. This makes it possible to efficiently and stably obtain nickel sulfide of which the particle diameter is controlled to be in a predetermined appropriate range.

As also illustrated in the process chart of FIG. 1, it is preferable to repeatedly use a part of the nickel sulfide obtained in this sulfidization step S4 in the sulfidization reaction in the sulfidization step S4 as a seed crystal (arrow R in FIG. 1). As described above, the nickel sulfide obtained through the sulfidization step S4 in the present embodiment has a particle diameter that is controlled to be in an appropriate range, specifically, a range of about from 10 to 60 µm as an average particle diameter. Hence, it is possible to easily and efficiently obtain nickel sulfide to be added as a seed crystal by repeatedly using the nickel sulfide thus obtained and adjusting the particle diameter of the nickel sulfide thus obtained to be in a range of from 5 to 20 µm through a classification treatment or the like. In addition, it is possible to even more effectively control the particle diameter of nickel sulfide to be obtained to be in an appropriate range by repeatedly using nickel sulfide in this manner so that the amount of nickel in the sulfidization reaction starting liquid is at a proportion of from 40 to 500% by mass.

EXAMPLES

Hereinafter, the present invention will be described more specifically with reference to Examples, but the present invention is not limited to the following Examples at all.

Example

A solution of nickel sulfate having a nickel concentration of from 1.0 to 3.0 g/L as a starting liquid was introduced into a four-stage continuous stirring reaction tank, and nickel sulfide having a particle diameter adjusted to be in a range of from 7 to 15 μm as a seed crystal was added to the reaction tank while changing the amount in a range of from 40 to 500% by mass (40% by mass or more and 500% by mass or less) with respect to the amount of nickel contained in the starting liquid. Incidentally, as presented in the following Table 1, nickel sulfide was added at the respective proportions of 40% by mass or more and less than 100% by mass, 100% by mass or more and 150% by mass or less, more than 150% by mass and 200% by mass or less, and more than 200% by mass and 500% by mass or less with respect to the amount of nickel in the starting liquid.

Here, as nickel sulfide of the seed crystal, nickel sulfide prepared by concentrating and separating the slurry which was obtained by the sulfidization reaction of the solution of nickel sulfate and contained nickel sulfide by using a thickener, recovering the nickel sulfide from the bottom portion of the thickener, and classifying the nickel sulfide by using a liquid cyclone to adjust the particle diameter to be in a range of from 7 to 15 μm was repeatedly used.

More specifically, in Examples, the seed crystal was added to the initial reaction tank (first sulfidization reaction tank) among the four stages of continuous stirring reaction tanks together with the solution of nickel sulfate of the starting liquid and hydrogen sulfide ($H_2S$) gas was supplied such that the entire quantity of hydrogen sulfide gas to be supplied was supplied to the first sulfidization reaction tank to have a blow quantity (added quantity) in a range of from 0.33 to 0.82 $Nm^3$/kg-Ni or a part of the hydrogen sulfide gas to be supplied was also supplied to the second sulfidization reaction tank while being distributed after the blow quantity of hydrogen sulfide gas in the first sulfidization reaction tank was set to be in a range of from 0.33 to 0.82 $Nm^3$/kg-Ni to cause the sulfidization reaction.

The slurry which was generated by such a sulfidization reaction and contained nickel sulfide was sent to a thickener and subjected to a sedimentation separation treatment to separate the slurry into nickel sulfide and a poor liquid (final liquid). The particle diameter of nickel sulfide settled in the thickener and the nickel concentration in the liquid which overflowed the thickener and was a poor liquid at this time were determined. Incidentally, the particle diameter of nickel sulfide was measured by using a laser diffraction type particle size distribution apparatus. In addition, the nickel concentration in the liquid overflowed was measured by using an ICP atomic emission spectrometer.

The respective measurement results are presented in the following Table 1. In addition, a graph illustrating the relationship between the blow quantity of hydrogen sulfide gas and the average particle diameter of the nickel sulfide generated is presented in FIG. 2.

TABLE 1

| Amount of seed crystal added (Repetitive amount) | Nickel concentration in starting liquid [g/L] | Amount of nickel input [Ni-kg/Hr] | First sulfidization reaction tank | | Second sulfidization reaction tank | |
|---|---|---|---|---|---|---|
| | | | Quantity of $H_2S$ gas supplied [$Nm^3$/Hr] | Blow quantity of $H_2S$ gas [$Nm^3$/kg-Ni] | Quantity of $H_2S$ gas supplied [$Nm^3$/Hr] | Blow quantity of $H_2S$ gas [$Nm^3$/kg-Ni] |
| 40% by mass or more | 2.2 | 2500 | 923 | 0.37 | 680 | 0.27 |
| | 2.8 | 3238 | 1227 | 0.37 | 740 | 0.23 |
| Less than 100% by mass | 2.3 | 2793 | 985 | 0.35 | 608 | 0.22 |
| | 2.2 | 3152 | 1047 | 0.33 | 805 | 0.26 |
| 100% by mass or more | 1.1 | 1013 | 831 | 0.82 | 0 | 0 |
| | 1.0 | 896 | 575 | 0.64 | 0 | 0 |
| 150% by mass or less | 1.6 | 1389 | 928 | 0.67 | 0 | 0 |
| | 2.6 | 2370 | 1107 | 0.47 | 0 | 0 |
| | 2.2 | 1946 | 751 | 0.39 | 351 | 0.18 |
| | 2.1 | 2111 | 832 | 0.39 | 364 | 0.17 |
| | 2.5 | 2597 | 931 | 0.36 | 742 | 0.29 |
| More than 150% by mass | 1.4 | 1230 | 803 | 0.65 | 0 | 0 |
| | 1.0 | 931 | 684 | 0.74 | 0 | 0 |
| 200% by mass or less | 2.1 | 1851 | 1027 | 0.55 | 0 | 0 |
| | 2.3 | 2323 | 887 | 0.38 | 419 | 0.18 |
| | 1.9 | 1789 | 692 | 0.39 | 375 | 0.21 |
| | 2.5 | 2515 | 956 | 0.38 | 459 | 0.18 |
| | 1.9 | 1922 | 733 | 0.38 | 366 | 0.19 |
| More than 200% by mass | 1.3 | 1156 | 858 | 0.74 | 0 | 0 |
| | 2.5 | 2359 | 879 | 0.37 | 482 | 0.20 |
| 500% by mass or less | 2.8 | 2587 | 1168 | 0.45 | 0 | 0 |
| | 3.0 | 1145 | 649 | 0.57 | 170 | 0.15 |

| Amount of seed crystal added (Repetitive amount) | Nickel concentration in starting liquid [g/L] | Seed crystal addition rate (Repetitive rate) [%] | Average particle diameter of seed crystal [μm] | Ni concentration in final liquid [g/L] | Average particle diameter of nickel sulfide [μm] |
|---|---|---|---|---|---|
| 40% by mass or more | 2.2 | 47 | 14.4 | 0.09 | 54.8 |
| | 2.8 | 69 | 11.4 | 0.08 | 45.2 |
| Less than 100% by mass | 2.3 | 75 | 10.3 | 0.09 | 57.0 |
| | 2.2 | 80 | 10.3 | 0.08 | 44.6 |
| 100% by mass or more | 1.1 | 144 | 9.5 | 0.06 | 15.4 |
| | 1.0 | 148 | 8.9 | 0.05 | 21.2 |
| 150% by mass or less | 1.6 | 137 | 9.3 | 0.09 | 27.3 |
| | 2.6 | 123 | 11.2 | 0.07 | 29.8 |
| | 2.2 | 133 | 9.9 | 0.03 | 41.0 |
| | 2.1 | 112 | 10.0 | 0.08 | 47.9 |
| | 2.5 | 125 | 9.1 | 0.05 | 51.1 |

TABLE 1-continued

|  |  |  |  |  |  |
|---|---|---|---|---|---|
| More than 150% by mass 200% by mass or less | 1.4 | 194 | 9.6 | 0.08 | 12.4 |
|  | 1.0 | 161 | 7.9 | 0.07 | 16.7 |
|  | 2.1 | 164 | 10.9 | 0.04 | 23.6 |
|  | 2.3 | 193 | 11.0 | 0.10 | 26.7 |
|  | 1.9 | 164 | 9.7 | 0.05 | 28.4 |
|  | 2.5 | 164 | 11.5 | 0.07 | 30.3 |
|  | 1.9 | 197 | 9.8 | 0.06 | 32.0 |
| More than 200% by mass 500% by mass or less | 1.3 | 247 | 9.0 | 0.13 | 13.5 |
|  | 2.5 | 260 | 10.8 | 0.04 | 22.3 |
|  | 2.8 | 290 | 11.9 | 0.18 | 22.7 |
|  | 3.0 | 485 | 11.1 | 0.25 | 16.9 |

Figure 2:
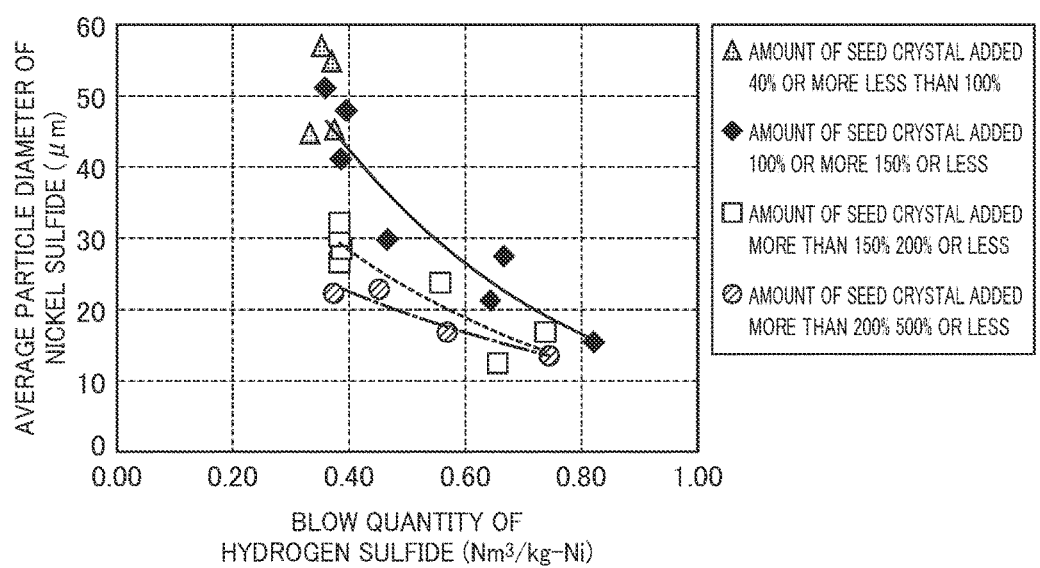
FIG. 2 is a graph illustrating the relationship between the average particle diameter of nickel sulfide generated and the blow quantity (added quantity) of hydrogen sulfide gas.

As presented in Table 1 and FIG. 2, it was possible to appropriately control the average particle diameter of nickel sulfide to be precipitated by the sulfidization reaction to be in a range of from 15 to 55 µm by adjusting the quantity of hydrogen sulfide gas supplied to the solution of nickel sulfate to which nickel sulfide having an adjusted particle diameter as a seed crystal was added, for example, in an amount of 100% by mass or more and 150% by mass or less with respect to the amount of nickel contained in the starting liquid such that the addition rate of hydrogen sulfide gas in the first sulfidization reaction tank was in a range of from 0.36 to 0.82 $Nm^3$/kg-Ni.

In addition, in a case in which the amount of seed crystal added was set to 50% by mass or more and less than 100% by mass and the addition rate of hydrogen sulfide gas in the first sulfidization reaction tank was adjusted to about from 0.33 to 0.37 $Nm^3$/kg-Ni, it was possible to control the particle diameter of nickel sulfide to be in a range of from 40 to 60 µm as an average particle diameter although the particle diameter tended to be relatively large. Incidentally, it was found that the nickel concentration in the final liquid after the sulfidization reaction increased and the actual yield of nickel tended to decrease as compared to a case in which the amount of nickel sulfide added as the seed crystal was set to 100% by mass or more and 150% by mass or less.

In addition, in a case in which the amount of seed crystal added was 150% by mass or more and 500% by mass or less and the addition rate of hydrogen sulfide gas in the first sulfidization reaction tank was adjusted to from 0.38 to 0.74 $Nm^3$/kg-Ni, it was possible to control the particle diameter of nickel sulfide to be in a predetermined range as the average particle diameter was from 12.4 to 32.0 µm although the particle diameter tended to be relatively small. Incidentally, it was found that the nickel concentration in the final liquid after the sulfidization reaction was increased and the actual yield of nickel tended to decrease as compared to a case in which the amount of nickel sulfide added as the seed crystal was set to 100% by mass or more and 150% by mass or less.

From the results of Examples described above, it was found that it is possible to appropriately control the particle diameter of nickel sulfide to be obtained to be in a predetermined range by setting the added amount of nickel sulfide having an adjusted particle diameter as the seed crystal to an amount of 40% by mass or more and 500% by mass or less with respect to the amount of nickel in the sulfidization reaction starting liquid and blowing hydrogen sulfide gas into the sulfidization reaction starting liquid in a blow quantity adjusted to be in a range of from 0.30 to 0.85 $Nm^3$/kg-Ni to cause the sulfidization reaction.

It was found that it is possible to control the particle diameter of nickel sulfide to be in a more preferable and appropriate range, to keep the nickel concentration in the final liquid low, to more effectively suppress a decrease in the actual yield of nickel by setting the amount of nickel sulfide added as the seed crystal to be in a range of 100% by mass or more and 150% by mass or less with respect to the amount of nickel in the starting liquid among them.

Comparative Example 1

The sulfidization reaction was caused by setting the amount of nickel sulfide added as the seed crystal to 20% by mass with respect to the amount of nickel contained in the starting liquid and the blow quantity of hydrogen sulfide gas to be blown into the first sulfidization reaction tank to 0.20 $Nm^3$/kg-Ni. Incidentally, conditions other than these are the same as in Examples.

As a result, the average particle diameter of nickel sulfide thus generated was 100 µm or more, which is too large.

Comparative Example 2

The sulfidization reaction was caused by setting the amount of nickel sulfide added as the seed crystal to 600% by mass with respect to the amount of nickel contained in the starting liquid and the blow quantity of hydrogen sulfide gas to be blown into the first sulfidization reaction tank to 0.90 $Nm^3$/kg-Ni. Incidentally, conditions other than these are the same as in Examples.

As a result, the nickel concentration in the final liquid after the sulfidization reaction was completed was 0.32 g/L, which is significantly high and the actual yield of nickel decreased. In addition, the average particle diameter of nickel sulfide thus obtained was 8 µm.

Comparative Example 3

The sulfidization reaction was caused by setting the amount of nickel sulfide added as the seed crystal to 20% by mass with respect to the amount of nickel contained in the starting liquid and the blow quantity of hydrogen sulfide gas to be blown into the first sulfidization reaction tank to 0.37 $Nm^3$/kg-Ni. Incidentally, conditions other than these are the same as in Examples.

As a result, the average particle diameter of nickel sulfide thus generated was 100 µm or more, which is too large.

Comparative Example 4

The sulfidization reaction was caused by setting the amount of nickel sulfide added as the seed crystal to 600% by mass with respect to the amount of nickel contained in the starting liquid and the blow quantity of hydrogen sulfide gas to be blown into the first sulfidization reaction tank to 0.37 $Nm^3$/kg-Ni. Incidentally, conditions other than these are the same as in Examples.

As a result, the nickel concentration in the final liquid after the sulfidization reaction was completed was 0.30 g/L, which is significantly high and the actual yield of nickel decreased. In addition, the average particle diameter of nickel sulfide thus obtained was 8 μm.

As can be seen from these results of Comparative Examples 1 to 4, it was found that the particle diameter of nickel sulfide to be generated is minimized or maximized and the actual yield of nickel decreases under the conditions that the amount of nickel sulfide added as the seed crystal exceeds the range of from 40 to 500% by mass and the blow quantity of hydrogen sulfide gas exceeds the range of from 0.30 to 0.85 $Nm^3$/kg-Ni.

The invention claimed is:

1. A method for producing nickel sulfide, the method comprising obtaining nickel sulfide by blowing hydrogen sulfide gas into an acidic solution of sulfuric acid containing nickel to cause a sulfidization reaction, wherein
nickel sulfide having a particle diameter of from 10 to 60 μm is recovered by
using a plurality of sulfidization reaction tanks,
adding nickel sulfide having a particle diameter of from 5 to 20 μm as a seed crystal to the acidic solution of sulfuric acid having a nickel concentration of from 0.5 to 5.0 g/L in an amount to be at a proportion of from 40 to 500% by mass with respect to an amount of nickel contained in the acidic solution of sulfuric acid
in a first sulfidization reaction tank for initially causing a sulfidization reaction, and
adjusting a blow quantity of hydrogen sulfide gas to be blown into the first sulfidization reaction tank to from 0.33 to 0.82 $Nm^3$/kg-Ni.

2. The method for producing nickel sulfide according to claim 1, wherein
nickel sulfide having a particle diameter of from 15 to 55 μm is recovered by
adding nickel sulfide having a particle diameter of from 5 to 20 μm as the seed crystal at a proportion of from 100 to 150% by mass with respect to an amount of nickel contained in the acidic solution of sulfuric acid containing nickel in the first sulfidization reaction tank and
adjusting a blow quantity of hydrogen sulfide gas to be blown into the first sulfidization reaction tank to from 0.33 to 0.82 $Nm^3$/kg-Ni.

3. The method for producing nickel sulfide according to claim 1, wherein nickel sulfide obtained by the sulfidization reaction is repeatedly used as nickel sulfide to be added as the seed crystal.

4. The method for producing nickel sulfide according to claim 1, wherein the acidic solution of sulfuric acid containing nickel is a leachate obtained by subjecting nickel oxide ore to a leaching treatment using sulfuric acid in a hydrometallurgical method for nickel oxide ore.

5. A hydrometallurgical method for nickel oxide ore to leach out nickel from nickel oxide ore by using sulfuric acid and to generate a sulfide containing nickel from the leachate obtained, the method comprising:
a sulfidization step of recovering nickel sulfide having a particle diameter of from 10 to 60 μm by using a plurality of sulfidization reaction tanks, adding nickel sulfide having a particle diameter of from 5 to 20 μm as a seed crystal to a leachate having a nickel concentration of from 0.5 to 5.0 g/L in an amount to be at a proportion of from 40 to 500% by mass with respect to an amount of nickel contained in the leachate in a first sulfidization reaction tank for initially causing a sulfidization reaction, and
adjusting a blow quantity of hydrogen sulfide gas to be blown into the first sulfidization reaction tank to from 0.33 to 0.82 $Nm^3$/kg-Ni.

* * * * *